United States Patent [19]
Moore

[11] 3,797,348
[45] Mar. 19, 1974

[54] TOWEL CUTTER APPARATUS

[76] Inventor: Arthur Ronald Moore, 3512 Hilly Ln., Elkhart, Ind. 46514

[22] Filed: Jan. 26, 1973

[21] Appl. No.: 327,151

[52] U.S. Cl.............................. 83/209, 83/212, 83/467
[51] Int. Cl................................................ B26d 5/20
[58] Field of Search....... 83/18, 175, 209, 210, 211, 83/212, 222, 467, 268, 94

[56] References Cited
UNITED STATES PATENTS
2,728,392  12/1955  Marsh et al....................... 83/211 X
3,182,536  5/1965  Sumpter, Jr. et al............. 83/175 X Primary Examiner—Willie G. Abercrombie
Attorney, Agent, or Firm—Oltsch & Knoblock

[57] ABSTRACT

Apparatus for handling an elongated piece of towel material and cutting the material into selected lengths to form individual towels. The towel material is moved across a table surface and at selected locations is engaged by a plurality of comb-like teeth which serve to position the towel material for a cutter blade which traverses the material and severs the material into sections forming the individual towels.

8 Claims, 16 Drawing Figures

TOWEL CUTTER APPARATUS

SUMMARY OF THE INVENTION

This invention relates to apparatus for cutting towels and will have particular application to an improvement for holding and positioning the elongated towel material while the material is being severed into sections by a traversable cutter.

An elongated piece of towel material consisting of interwoven longitudinal and transverse threads is drawn across a table surface and over protruding comb-like teeth which, at selected locations in the towel material, pass therethrough causing the material to be halted and positioned for the receipt of a cutting tool which traverses the table surface and severs the material into sections forming individual towels. This invention pertains specifically to the shape of the comb-like teeth which can be utilized for smooth surfaced towel material as well as rough surfaced material such as terrycloth.

Heretofore, each tooth of the towel cutter was formed by juxtaposed circular bar-like members which had a tendency to snag terrycloth and similar rough surfaced towel materials. The improved teeth of this invention are of such a shape that terrycloth as well as other types of towel material can be utilized in the cutter without being snagged or torn by the teeth.

Accordingly, it is an object of this invention to provide a cutter for towels which is of an improved construction so as to accommodate terrycloth and similar type towel material.

Another object of this invention is to provide towel cutting apparatus including comb-like teeth of improved design which serve to stop and position the towel material in preparation for cutting.

Other objects of this invention will become apparent upon a reading of the invention's description.

BRIEF DESCRIPTION OF THE DRAWINGS

A preferred embodiment of this invention has been chosen for purposes of illustration and description wherein.

DESCRIPTION OF THE PREFERRED EMBODIMENT

The preferred embodiment illustrated is not intended to be exhaustive or to limit the invention to the precise form disclosed. It is chosen and described in order to best explain the principles of the invention and its application and practical use to thereby enable others skilled in the art to best utilize the invention.

The following is a general description of the prior art towel cutter assembly developed by the inventor and in operation for the past several years.

Figure 1:
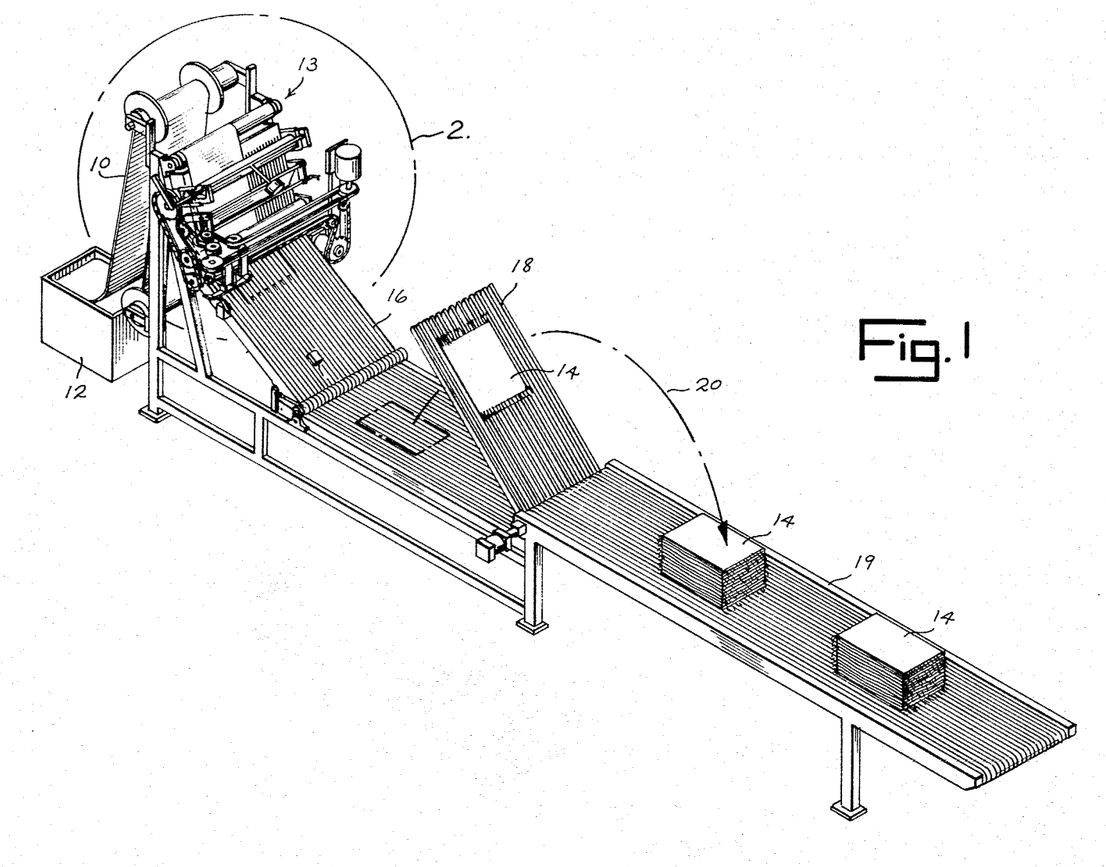
FIG. 1 is a perspective view of the towel cutter assembly including a towel stacker.

Referring to FIG. 1, elongated towel material 10 is pulled from a suitable box 12 or other type receptacle or in roll form through the cutter apparatus 13 shown within broken line circle 2. As the towel material 10 is moved through apparatus 13, it is cut into sections, each constituting an individual towel 14. Each towel 14 is then transported by a conveyor 16 onto a lift-like table 18 which is pivoted as indicated by broken line arrow 20 so as to cause the towels 14 to be stacked on a table 19. From table 19 the stacked towels 14 can be boxed and transported.

Figure 2:
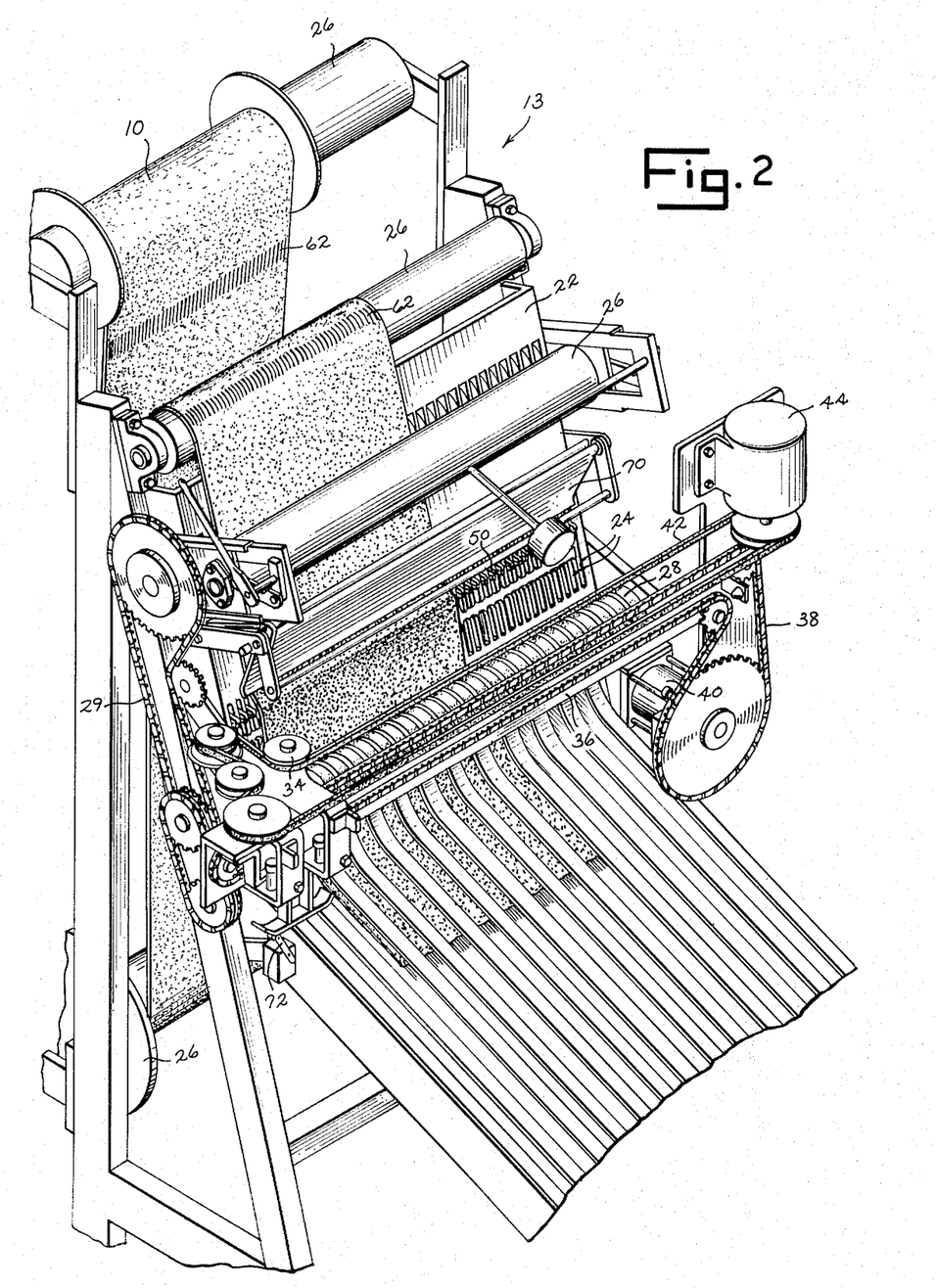
FIG. 2 is a perspective view of the cutting apparatus shown within broken line circle 2 in FIG. 1.
Figure 3:
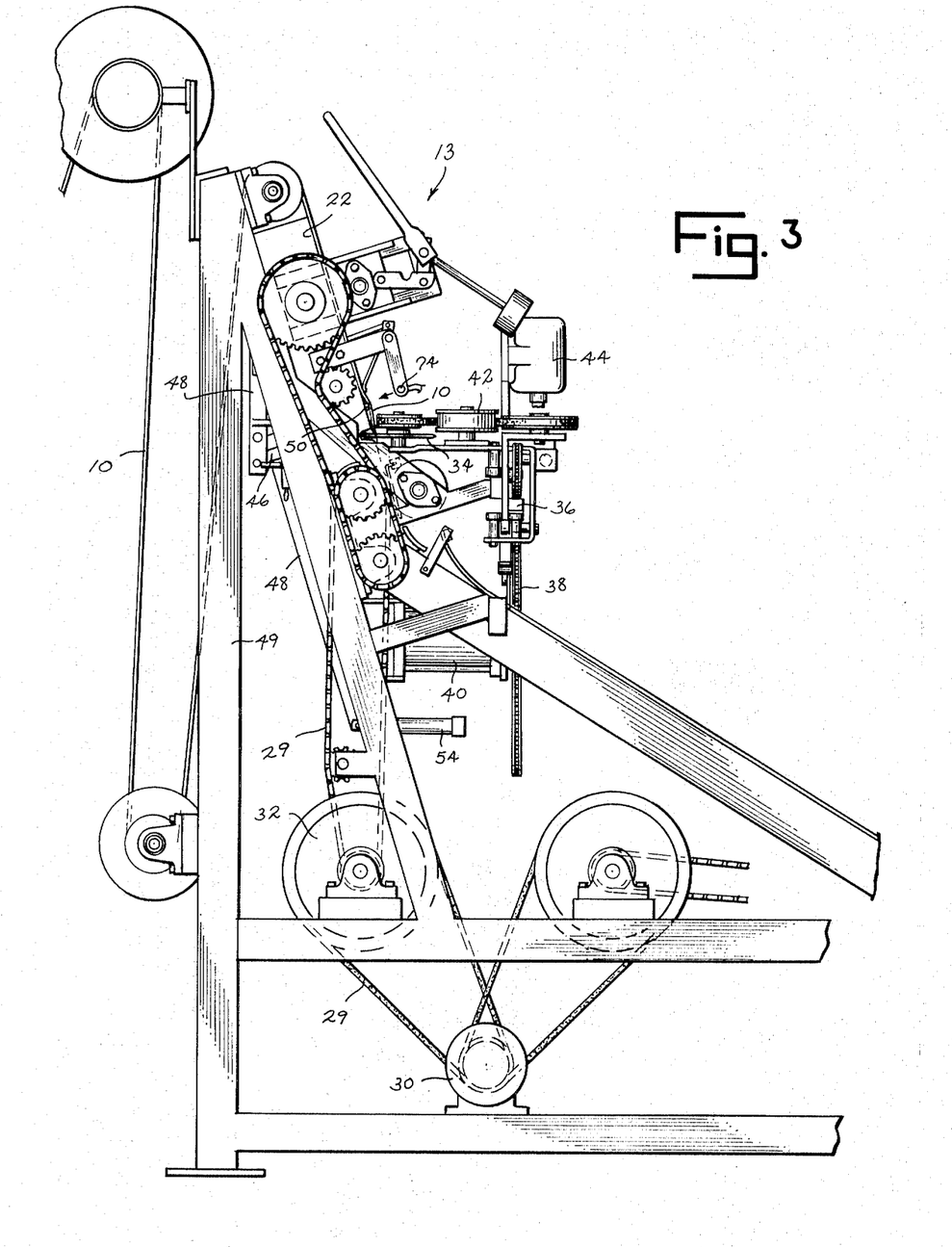
FIG. 3 is an end view of the cutting apparatus of FIG. 2 as seen from the left.

Cutter apparatus 13 as illustrated in FIGS. 2–3 includes a table surface 22 having a plurality of longitudinally oriented slotted openings 24 formed therein. Towel material 10 is pulled from box 12 and moved over table surface 22 by means of a plurality of idler rollers 26 and power rollers 28. Power rollers 28 are of the friction type, making moving contact with towel material 10, and are powered through a suitable belt, pulley and chain drive system 29 connected to an electric motor 30. A clutch-brake 32, which is preferably electrically actuated, is operatively located between motor 30 and drive rollers 28. The function of clutch-brake 32 will be later described.

Figure 4:
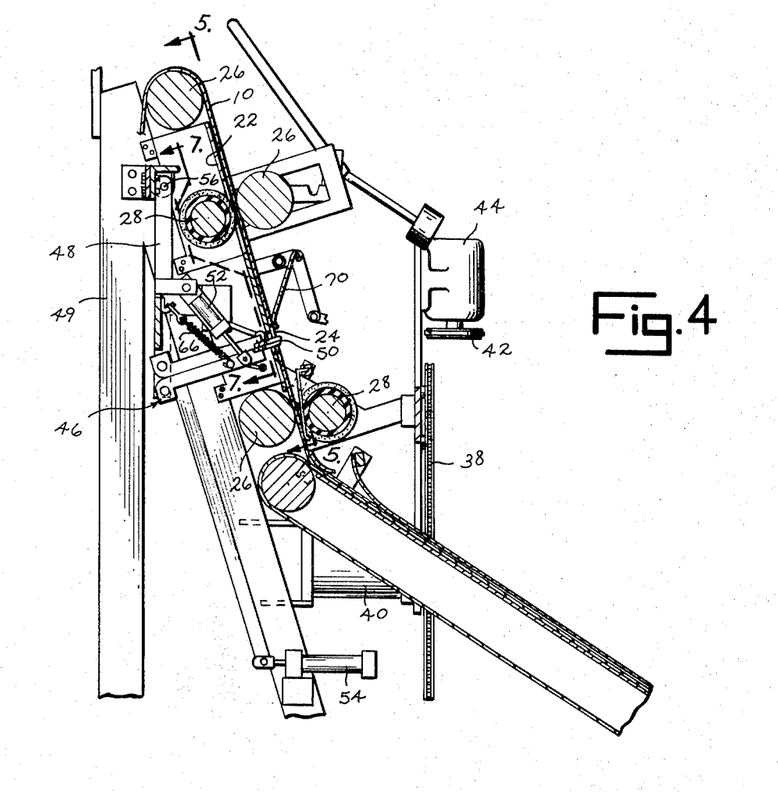
FIG. 4 is a sectional view taken along line 4—4 of FIG. 5.
Figure 8:
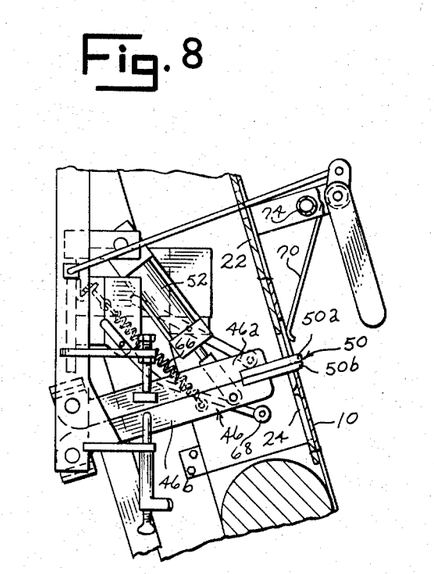
FIG. 8 is a sectional view taken along line 8—8 of FIG. 7.
Figure 10:
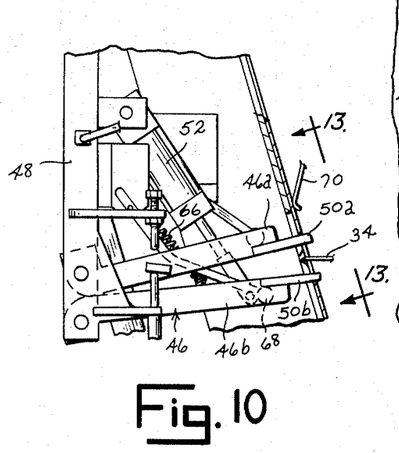
FIG. 10 is a view like FIGS. 8 and 9 showing the apparatus in a following sequential operational position.
Figure 11:
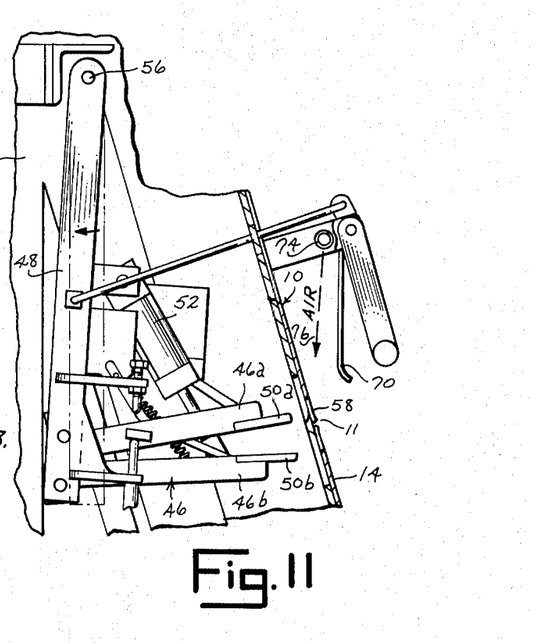
FIG. 11 is a view of the apparatus of FIGS. 8–10 showing the apparatus thereof in a following sequential operational position.

A rotatable disk-like cutter blade 34 is carried upon a track 36 so as to experience movement across table surface 22 at openings 24 therein. Cutter blade 34 is caused to traverse track 36 by means of a chain and pulley drive 38 powered by a motor 40. Additionally, cutter blade 34 is rotated during its movement across table surface 22 by means of a belt and pulley drive system 42 connected to a motor 44. A two-piece comblike bar 46 is carried behind table surface 22 upon a pivotal frame 48. Bar 46 consists of two plates 46a and 46b which are each pivotally connected at one end to frame 48. A pneumatic power cylinder 52 is connected between frame 48 and lower plate 46b of bar 46 so as to cause the independent pivotal movement of bar 46b, as illustrated in FIG. 8 and 10. Bar 46 includes a plurality of laterally spaced teeth 50. Each tooth 50 consists of tooth parts 50a and 50b, with part 50a being fixedly connected to bar plate 46a and with part 50b being fixedly connected to bar plate 46b at the free ends of the plate. A pneumatic power cylinder 54, as best seen in FIGS. 3 and 4, is connected between fixed frame 49 of the cutter apparatus and an extension of frame 48 so as to cause frame 48, upon actuation of the power cylinder, to be swung about its pivot connection 56 to frame 49. Through the actuation of power cylinder 54, bar 46 can be shifted between the position shown in FIG. 8 in which each tooth 50 protrudes through an opening 24 in table surface 22 and the position illustrated in FIG. 11 in which teeth 50 are withdrawn from the table surface opening.

Figure 9:
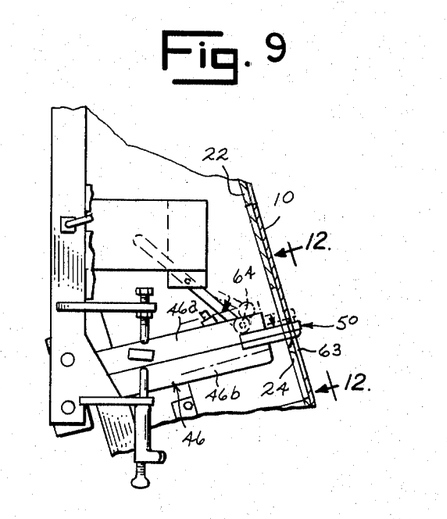
FIG. 9 is a view like FIG. 8 showing the apparatus thereof in a sequential operational position.

The operation of cutter apparatus 13 will now be described. Towel material 10 is pulled from box 12 and fed across table surface 22 by power rollers 28. Teeth 50 with parts 50a and 50b thereof in their closed position, as seen in FIGS. 8 and 9, protrude through openings 24 in the table surface. Towel material 10 includes interwoven longitudinal threads 58 and transverse threads 60. At selected spaced locations 62 along towel material 10 there is an absence of transverse threads 60. It is at locations 62 that the individual towels 14 will be cut from the elongated towel material.

Figure 5:
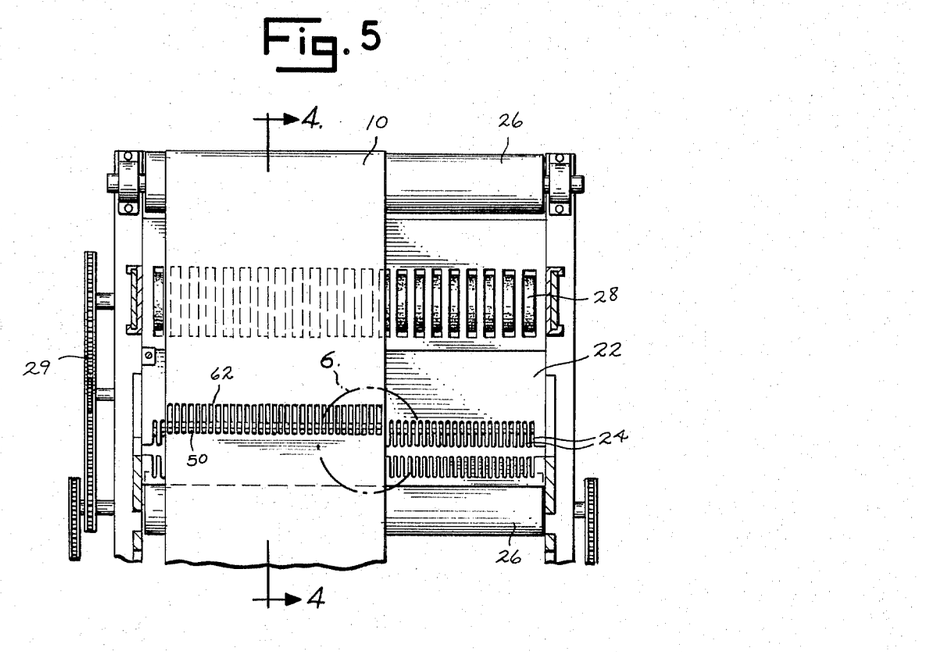
FIG. 5 is a sectional view taken along line 5—5 of FIG. 4.
Figures 6, 12:
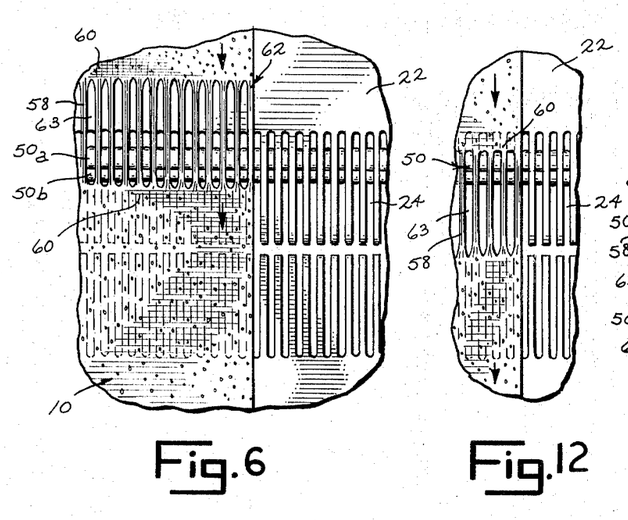
FIG. 6 is an enlarged view of that portion of FIG. 5 enclosed within broken line circle 6.
FIG. 12 is an enlarged view as seen from line 12—12 of FIG. 9.
Figure 7:
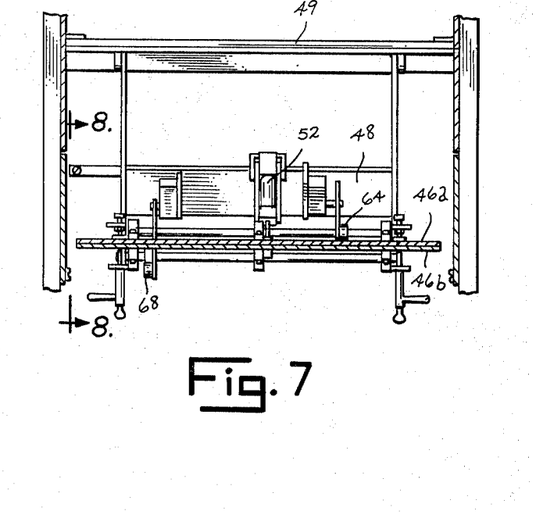
FIG. 7 is a sectional view taken along line 7—7 of FIG. 4.
Figure 13:
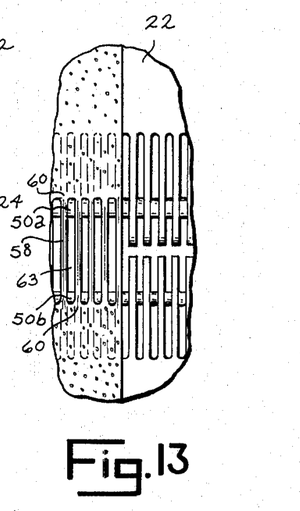
FIG. 13 is an enlarged view seen from line 13—13 of FIG. 10.

As towel material 10 is pulled over table surface 22 and across protruding teeth 50, transverse threads 60 in the towel material will prevent the teeth from protruding through the material and thus will cause the material to be bent over the teeth as shown in FIGS. 1 and 2. When a location 62, which designates an absence of transverse threads 60, reaches teeth 50 as the power rollers continue to pull the material across the table surface, the teeth will protrude through the spaces 63 between threads 58 at the location as illustrated in FIGS. 5, 6 and 8. Continued towel material movement across the table surface causes transverse threads 60 at the upper end of location 62 to contact teeth 50 as illustrated in FIG. 12 and to shift bar 46 downwardly from the broken line to the solid line position in FIG. 9. As bar 46 is moved downwardly by the towel material, a switch 64 is actuated to cause disengagement of clutch-brake 32 and the braking of power rollers 28 to stop the progression of towel material 10 across table surface 22. It will be noted that bar 46 and its parts 46a and 46b are held the upper position seen in FIG. 8 by means of a spring 66 which is secured between frame 48 and lowermost bar part 46b. When teeth 50 protrude through the towel material and are engaged by transverse threads 60 at the upper end of the location 62, spring 66 will give to allow bar 46 to be shifted downwardly a selected distance as determined by a switch 68. At the instant switch 64 is actuated by the downward movement of bar 46 to cause a braking of power rollers 28 and stopping of the movement of towel material 10 across table surface 22, power cylinder 52 is actuated to cause bar plates 46a and 46b and associated tooth parts 50a and 50b to separate, as shown in FIGS. 10 and 13 and engage opposite transverse threads 60 at location 62, thereby positioning the towel material for cutting. Upon the opening of tooth parts 50a and 50b, motors 40 and 44 are activated to cause rotation of cutter blade 34 and the movement of the cutter blade across table surface 22 as seen in FIG. 10, thereby severing the longitudinal threads 58 at location 62 to form a towel 14.

During movement of the towel material across table surface 22 and the cutting of the material, a hold-down cam 70 presses the material against the outer face of the table surface. A switch 72, as seen in FIG. 2, is contacted by the cutter blade 34 as it completes its traverse of the table surface to cause actuation of power cylinder 54. Upon actuation of power cylinder 54, frame 48, including bar 46, is pivoted so as to withdraw teeth 50 from openings 24 in the table surface. As teeth 50 are withdrawn from openings 24, hold-down cam 70 which is operatively connected to frame 48 is pivoted away from towel material 10 and clutch-brake 32 is actuated to operatively reconnect motor 30 with power rollers 28 to cause towel material 10 to proceed across table surface 22 where compressed air from a suitable compressed air source issues from an orifice 74, as illustrated by arrow 76 in FIG. 11, to feed the free end 11 of towel material 10 between lower power roller 28 and the adjacent idler roller 26. At this time, power cylinder 52 is reactuated to close bar plates 46a and 46b, after which power cylinder 54 causes bar 46 to be swung forwardly so as to reposition teeth 50 in openings 24 in table surface 22 and against the overpassing towel material 10, as illustrated in FIGS. 2 and 3, in preparation for the next cutting operation which takes place as the next location 62 in the towel material passes over the protruding teeth. Simultaneously, conveyor 16 serves to move the newly cut towel 14 onto table 18. It is to be understood that the above described cutting operation and intermittent towel material movement across table surface 22 is quite rapid.

Figure 14:
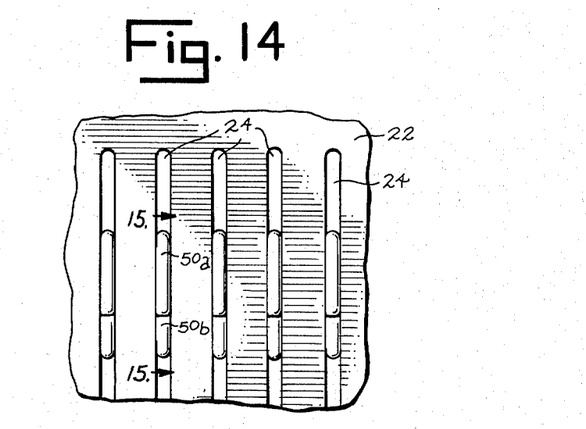
FIG. 14 is an enlarged view showing the teeth of the cutter apparatus protruding from the cutter table surface.
Figure 15:
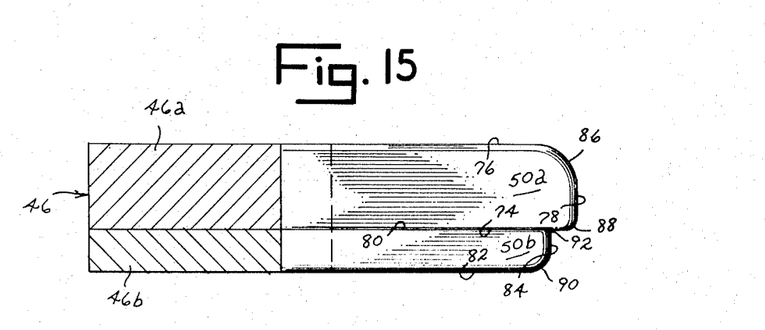
FIG. 15 is a sectional view taken along line 15—15 of FIG. 14.
Figure 16:
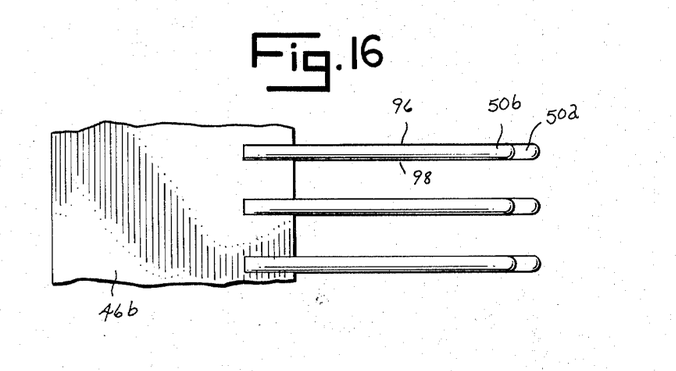
FIG. 16 is an enlarged view of the teeth of FIG. 15 as seen from below.

The subject matter of this invention has specific reference to the construction of teeth 50 which form a part of cutter apparatus 13 and which serve, as above described, to hold and position the towel material 10 in preparation for its cutting. Heretofore in prior constructions of the cutter apparatus, each tooth part of bar 46 was of a circular rod configuration, having a flattened end face perpendicularly disposed relative to the axis of the tooth part with the junction of the end face and the cylindrical body of the tooth part being rounded. As previously mentioned, this construction of teeth caused the snagging and tearing of rough towel material, such as terrycloth. The improved teeth 50 of this invention corrected this problem of snagging and rendered the cutter apparatus applicable to all towel material. Each tooth 50, as seen in FIGS. 14 and 16, is of a substantially rectangular cross sectional configuration. Each tooth part 50a includes an inner side edge 74, a parallel outer side edge 76, and a front end edge 78. Each tooth part 50b includes an inner side edge 80, a parallel outer side edge 82, and a front end edge 84 which is inset from end edge 78 of the cooperating tooth part 50a. The inner side edge, outer side edge and front end edge of each tooth part is slightly rounded with the junction of the end edges with the inner and outer side edges being on a radius, forming arcuate edge sections. The arcuate edge section 86 forming the junction between outer side edge 76 and end edge 78 of tooth part 50a is of a greater radius than the arcuate edge section 88 which forms the junction between inner side edge 74 and end edge 78 of the tooth part. Similarly, arcuate edge section 90 of tooth part 50b formed at the junction of outer edge 82 and end edge 84 is of a greater radius than the arcuate edge section 92 formed between inner edge 80 and end edge 84 of the tooth part. Additionally, the width of each tooth part 50a as measured between side edges 74 and 76 is approximately twice the width of cooperating tooth part 50b as measured between its side edges 80 and 82.

In the actual construction of an embodiment of this invention, teeth 50 were secured along bar 46 to parts 46a and 46b thereof on one-fourth inch centers with the thickness of each tooth being approximately one-sixteenth inch as measured between side faces 96 and 98. The width of each tooth part 50a as measured between side edges was three-eighths inch, while the width of each tooth part 50b was three-sixteenths inch. End edge 84 of each tooth part 50b was set in one-eighth inch from end edge 78 of each cooperating tooth part 50a.

It is to be understood that the invention is not to be limited to the details herein given, but may be modified within the scope of the appended claims.

What I claim is:

1. In a cutter for towels, said cutter including a table surface means having first and second ends and transverse opening means formed therein, means for moving elongated towel material lengthwise from said first to said second ends across said surface means and opening means therein, said material of the type formed by a plurality of interwoven longitudinal and transverse threads with adjacent transverse threads at selected locations being spaced an appreciable distance apart, cutting means for severing said longitudinal threads between said spaced adjacent transverse threads at a selected location in said material, support means for positioning and holding said material during said severing of said longitudinal threads, the improvement wherein said support means includes a plurality of laterally spaced comb-like teeth aligned across said surface means, each tooth protruding through said opening means into the path of movement of said material over said surface means and being divided longitudinally into separable first and second coplanar parts, means for shifting the parts of each tooth within said opening means in a plane paralleling the direction of movement of said material over said surface means between an open position wherein said parts are spaced apart sufficiently to contact spaced adjacent transverse threads at a selected location in said material and a closed position wherein said parts are together, each tooth part having a multiple sided cross sectional configuration, the first part of each tooth being located nearer to the first end of said table surface means than the second part of the tooth, the first part of each tooth including an inner side edge located next to the second part of the tooth and a parallel outer side edge and an end edge extending between said inner and outer edges, said end edge being joined to said outer and inner edges by arcuate edge sections, the edge section between said end and outer edges being formed on a greater radius than the edge section between said end and inner edges, the second tooth part of each tooth including an inner side edge located next to the first part of the tooth and a parallel outer side edge and an end edge extending between said inner and outer edges of the second tooth part, said end edge of the first part extending beyond the end edge of the second part of each tooth.

2. The cutter of claim 1 wherein the end edge of each second tooth part is joined to the outer and inner edges of the second tooth part by arcuate edge sections, the edge section between end and outer edges of said second tooth part being formed on a greater radius than the edge section between said end and inner edges of the second tooth part.

3. The cutter of claim 2 wherein the width of each first tooth part as measured between its inner and outer edges is at least twice the width of each second tooth part as measured between its said inner and outer edges.

4. The cutter of claim 1 wherein each tooth part includes opposite parallel side faces terminating at said inner and outer edges and said end edge of the tooth part, the width of each tooth part as measured between its inner and outer edges being greater than the thickness of such tooth part as measured between its side faces.

5. The cutter of claim 4 wherein each first tooth part width is at least two times the thickness of the first tooth part.

6. The cutter of claim 5 wherein the thickness of the first and second tooth parts of each tooth are equal.

7. The cutter of claim 6 wherein the combined widths of the first and second tooth parts of each tooth is greater than the thickness of the tooth parts.

8. The cutter of claim 4 wherein each first tooth part width is six times the thickness of the first tooth part.

* * * * *